United States Patent [19]

Beecher

[11] Patent Number: 5,161,677
[45] Date of Patent: Nov. 10, 1992

[54] CONVEYOR BELTING AND METHOD OF MANUFACTURE

[75] Inventor: Stephen P. Beecher, West Seneca, N.Y.

[73] Assignee: Globe International Inc., Buffalo, N.Y.

[21] Appl. No.: 754,732

[22] Filed: Sep. 4, 1991

[51] Int. Cl.$^5$ .............................. B65G 15/34
[52] U.S. Cl. .................. 198/847; 428/235; 428/253; 428/265; 428/375; 474/260; 474/263
[58] Field of Search ............... 198/846, 847; 474/260, 474/263, 268; 428/234, 235, 252, 253, 265, 375

[56] References Cited

U.S. PATENT DOCUMENTS

| | | | |
|---|---|---|---|
| 4,154,335 | 5/1979 | Burnett et al. | 428/235 X |
| 4,157,752 | 6/1979 | Sick et al. | 198/847 |
| 4,444,305 | 4/1984 | Parker et al. | 198/847 X |
| 4,522,866 | 6/1985 | Nishikawa et al. | 428/214 X |
| 4,613,533 | 9/1986 | Loomis et al. | 428/265 X |
| 4,762,750 | 8/1988 | Girgis et al. | 428/375 X |

*Primary Examiner*—Joseph E. Valenza
*Assistant Examiner*—Tuan N. Nguyen
*Attorney, Agent, or Firm*—Kane, Dalsimer, Sullivan, Kurucz, Levy, Eisele and Richard

[57] ABSTRACT

The disclosure is of conveyor belting and a method for its manufacture. The belting comprises a plurality of substantially parallel, uncrimped textile yarns of a specific character, embedded in a matrix of a specific class of ionomer elastomeric resin. The belting of the invention is useful to manufacture conveyor belts which exhibit advantageous properties of wear resistance, flexibility, stability in running, structural integrity and resistance to food, oils, fats, and like staining.

6 Claims, 1 Drawing Sheet

CONVEYOR BELTING AND METHOD OF MANUFACTURE

BACKGROUND OF THE INVENTION

1. Field of the Invention

The invention relates to conveyor belting and to methods of its manufacture.

2. Brief Description of the Prior Art

A review of the prior art is contained in the U.S. Pat. Nos. 4,154,335 and 4,157,752, which themselves describe improvements in conveyor belting fashioned from textile scrims embedded in matrices of non-cellular elastomeric polymeric resins. The beltings described are limited to certain applications because of their surface characteristics and physical properties. Also representative of the prior art are the descriptions found in the U.S. Pat. Nos. 3,509,006; 3,900,627; and 4,109,543.

The method and belting of our invention represent improvements in the art of conveyor belting, particularly useful in food processing lines.

The method of manufacture is economical, efficient and produces an advantageous product. The belting of the invention is useful in the manufacture of endless conveyor belts which exhibit advantageous properties of resistance to abrasion (particularly on the edges), flexibility, structural and running stability, resistance to delamination, dimensional uniformity and a high degree of stain resistance. The belting resists staining by foods, oils, fats, acids and like materials. The belting is therefore advantageous for use in food processing where belt staining is objectionable and unsanitary, such as in canning of fruits and vegetables, meat, poultry, fish processing, snack food processing and in the pharmaceutical industry. These and other advantages of the belting of the invention will be described in greater detail hereinafter.

SUMMARY OF THE INVENTION

The invention comprises a conveyor belting, which comprises;

a plurality of substantially parallel, uncrimped textile yarns characterized by their high tensile strength, low stretch and uniformity of shrink; embedded in a matrix of a synthetic non-cellular, elastomeric, ionic copolymer of α-olefin and α,β-ethylenically unsaturated carboxylic acid having from 3 to 8 carbon atoms, said copolymer having from 10% to 90% of the carboxylic acid groups ionized by neutralization with metal ions uniformly distributed throughout the copolymer, said copolymer being a direct copolymer of the α-olefins and the unsaturated carboxylic acid in which the carboxylic acid groups are randomly distributed over all molecules and in which (1) the α-olefin content of the copolymer is at least 50 mole percent, based on the α-olefin-acid copolymer, (2) the unsaturated carboxylic acid content of the copolymer is from 0.2 to 25 mole percent, based on the α-olefin-acid copolymer, and (3) any other monomer component optionally copolymerized in said copolymer is monoethylenically unsaturated, and said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions, said ionic copolymer having solid state properties characteristic of crosslinked polymers and melt-fabricability properties characteristic of an uncrosslinked, thermoplastic polymer; substantially encapsulating the parallel yarns.

The invention also comprises conveyor belts made from the belting of the invention and the use of the belting in conveyor belt applications.

DETAILED DESCRIPTION OF THE PREFERRED EMBODIMENTS OF THE INVENTION

Figure 1:
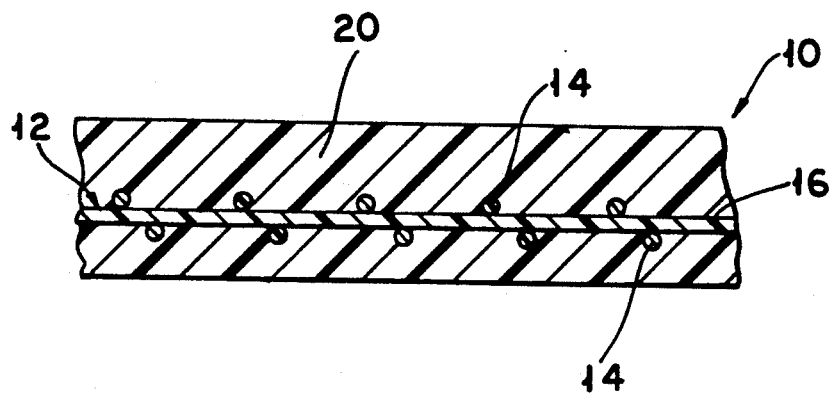
FIG. 1 is a cross-sectional, side elevation of a portion of an embodiment belting of the invention.

The textile yarns employed and embedded in the belting of the invention may be provided incorporated in a cloth. For example, the textile yarns provided may be in the form of lengthwise yarns in a woven cloth or preferably their equivalent in a knitted cloth. The term "substantially parallel" as used herein means that the lengthwise yarns, for the most part, do not cross over each other indiscriminately. The provided textile yarns require a relatively high tensile strength, i.e.; on the order of at least about 20 lbs. yarn or a tensile breaking strength greater than 50 lbs. per inch. Advantageously, the provided textile yarn will have low stretch (elongation) properties, for example on the order of at least about 1.0 percent ($\frac{1}{4}$ nominal breaking load) to about 3.0 percent at the specified working tension. It is important that the yarns exhibit uniformity in their shrink characteristics, i.e., yarns of a high degree of shrinkability should not be mixed with yarns of a low degree of shrinkability to minimize buckling or cockling of the belting.

The provided yarns may be selected from a wide variety of synthetic yarns, such as polyester, polyamide and like yarns. The yarns may be monofilament yarns, spun yarns or multifilament yarns. Preferably the yarns will be multifilament or the like.

In one embodiment of the invention, the textile yarns are provided in an open weave scrim of monofilament lengthwise yarns. Any weave may be used, a plain weave being stable and advantageous. In this embodiment, the nature of the crosswise yarns is not critical and any conventional synthetic or natural fiber yarn can be used. Advantageously the denier of the yarns and the density of the weave is selected to provide a scrim weight of from about 4 to about 40 oz./square yard for optimum strength.

In another embodiment, the textile yarns are provided in a polyester knit open mesh, which provides strength, width and length stability, a non wicking core, lace holding characteristics, splicing strength, increased flex life at the splice area. A weight of from 4 to 40 oz./square yard is advantageous.

In the next step of the method of the invention the fabric scrim is heat set. Elongation properties can be achieved by heat-setting. During heat setting, the fabric may be tensioned in the lengthwise direction (along the axis of the textile warp yarns) under from 0.5 to 20 lbs. per inch or more of fabric width. This eliminates a large degree of stretching in the final product, and obviates wrinkles across the width and along the length of the belt product of the invention. Heat setting is carried out under temperatures dependent on the nature of the fibers and yarns employed in the fabric. Those skilled in the art will know which temperatures to select. For example, when all polyester components are employed, heat setting may be carried out at temperatures within the range of from about 300° F. to 420° F.

The heat set, textile yarn material is then embedded in an non-cellular, elastomeric ionomer.

Ionomers are hydrocarbon polymers which contain ionic crosslinks. Representative of ionomers are ionic copolymers comprising a polymer of an α-olefin having the general formula $RCH=CH_2$ where R is a radical selected from the class consisting of hydrogen and alkyl radicals having from 1 to 8 carbon atoms.

The α-olefin polymers employed in the formation of the ionic copolymers are copolymers of α-olefins with ethylenically unsaturated acids. Representative olefins include ethylene, propylene, 1-butene, pentene-1, hexene-1, heptene-1, 3-methylbutene-1, 4-methylpentene-1, etc. The concentration of the α-olefin is at least 50 mole percent in the copolymer, and is preferably greater than 80 mole percent.

The second essential component of the base copolymer comprises an $\alpha,\beta$-ethylenically unsaturated carboxylic acid group containing monomer having preferably from 3 to 8 carbon atoms. Examples of such monomers are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that is has no hydrogen attached to the carboxyl groups, it can be considered an acid for the present purposes because its chemical reactivity is that of an acid. Similarly, other $\alpha,-62$ -monoethylenically unsaturated anhydrides of carboxylic acids can be employed. As indicated, the concentration of acidic monomer in the copolymer is from 0.2 mol percent to 25 mole percent, and, preferably, from 1 to 10 mole percent.

The base copolymers employed in forming the ionic copolymers may be prepared in several ways. Thus, the copolymers can be obtained by the copolymerization of a mixture of the olefin and the carboxylic acid monomer. This method is preferred for the copolymers of ethylene. Methods employed for the preparation of ethylene carboxylic acid copolymers have been described in the literature.

Preferred products are those obtained from base copolymers in which the carboxylic acid groups are randomly distributed over all of the copolymer molecules. Such distribution is obtained using the technique wherein the copolymerization of the α-technique olefin and the carboxylic acid monomers in a single phase environment, i.e.; one in which the monomers are soluble, e.g. benzene or ethylene, which may be in liquid or vaporized form.

Copolymers of α-olefins with carboxylic acids may also be prepared by copolymerization of the olefin with an $\alpha,\beta$-ethylenically unsaturated carboxylic acid derivative which subsequently or during copolymerization is reacted either completely or in part to form the free acid. Thus, hydrolysis, saponification or pyrolysis may be employed to form an acid copolymer from an ester copolymer.

The copolymers employed to form ionic copolymers which are useful as plastics are preferably of high molecular weight in order to achieve the outstanding combination of solid state properties of crosslinked polyolefins with the melt fabricability of uncrosslinked polyolefins.

The molecular weight of the copolymers useful as base resins is most suitably defined by melt index, a measure of viscosity, described in detail in ASTM-D-1238-57T. The melt index of copolymers employed in the formation of ionic copolymers which are useful as plastics is preferably in the range of 0.1 to 1000 g./10 min.

The copolymer base need not necessarily comprise a two component polymer. Thus, although the olefin content of the copolymer should be at least 50 mol percent, more than one olefin can be employed to provide the hydrocarbon nature of the copolymer base. Additionally, other copolymerizable monoethylenically unsaturated monomers, illustrative members of which are mentioned below can be employed in combination with the olefin and the carboxylic acid comonomer. The scope of base copolymers suitable for use in the present invention is illustrated by the following examples: ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methcrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluroethylene/methacrylic acid copolymers.

The preferred base copolymers, however, are those obtained by the direct copolymerization of ethylene with a monocarboxylic acid comonomer.

The ionic copolymers are obtained by the reaction of the above described copolymer base with an ionizable metal compound. This reaction is referred to as "neutralization." The reaction mechanism involved in the formation of the ionic copolymers and the exact structure of the copolymers are not completely understood. However, a comparison of the infrared spectrum of the copolymer base with that of the ionic copolymer shows the appearance of an absorption band at about 6.4 micron which is characteristic of the ionized carboxyl group, COO—, a decrease in the crystallinity band at 13.7 micron and a substantial decrease, depending on the degree of neutralization, of a band at 10.6 micron, characteristic of the unionized carboxyl group, COOH. It is consequently deduced that the surprising properties of ionic copolymers are the result of an ionic attraction between the metal ion and one or more ionized carboxylic acid groups.

This ionic attraction results in a form of crosslinking which occurs in the solid state. However, when molten and subjected to the shear stresses which occur during melt fabrication, the ionic crosslinks of these polymers are ruptured and the polymers exhibit melt fabricability essentially the same as that of the linear base copolymer. On cooling of the melt and in the absence of the shear stress occurring during fabrication, the crosslinks, because of their ionic nature, are reformed and the solidified copolymer again exhibits the properties of a crosslinked material.

The change in properties resulting from the neutralization of the base copolymer to the ionic copolymer is greatly influenced by the degree of neutralization and, therefore, the number of ionic crosslinks and the nature of the crosslink involved. Although an improvement in solid state properties is obtained with even a small percentage of the acid groups neutralized, in general, a noticeable improvement is observed only after 10 percent of the acid groups have been neutralized. However, to obtain the optimum solid state properties which are derivable from ionic copolymers, the number of crosslinks should be sufficient to form an infinite network of crosslinked polymer chains. This, of course, not only depends on the degree of neutralization, but also on the number of crosslinking sites and the molecular weight of the copolymer. In general, it was found that base copolymers having molecular weights as measured by melt indexes of 1 to 5 g./10 min. and a monocarboxylic acid concentration of 5 to 10 percent show optimum solid state properties upon 50 to 80 percent neutralization. The degree of neutralization can be decreased as the molecular weight of the copolymer base is increased or as the acid content of the copolymer base is increased without significantly changing the solid state properties. In general, no substantial further improvement in solid state properties is observed if the crosslinking is continued beyond the point at which an infinite network is formed. However, the shear stress necessary to break the ionic crosslinks and, thus, make the copolymer melt fabricable is steadily increased with an increasing number of crosslinks beyond that necessary to achieve an infinite network.

The melt fabricability of the ionic copolymer is affected not only by the number of crosslinks, but to a much greater degree, is affected by the nature of the crosslink. The combination of certain types of acid copolymers with certain metal ions results in intractable materials which do not lend themselves to melt fabrication. Thus, it was found that base copolymers with dicarboxylic acid comonomers, even those in which one acid radical has been esterified, when neutralized with metal ions which have two or more ionized valences, result in intractable ionic copolymers at the level of neutralization essential to obtain significant improvement in solid state properties. Similarly, base copolymers with monocarboxylic acid comonomers result in intractable ionic copolymers when neutralized to the indicated degree with metal ions which have four or more ionized valences. It is believed that the nature of the ionic bond in these instances is too strong to be suitable for the formation of ionic copolymers which exhibit solid state properties of crosslinked resins and molten properties of uncrosslinked resins.

Metal ions which are suitable in forming the ionic copolymers used in the present invention can be divided into two categories, uncomplexed metal ions and complexed metal ions. In the uncomplexed metal ions the valence of the ion corresponds to the valence of the metal. These metal ions are obtained from the commonly known and used metal salts. The complexed metal ions are those in which the metal is bonded to more than one type of salt group, at least one of which is ionized and at least one of which is not. Since the formation of the ionic copolymers requires only one ionized valence state, it will be apparent that such complexed metal ions are equally well suited in the present invention. The term "metal ion having one or more ionized valence states" means a metal ion having the general formula $Me+nX_m$, where n is the ionic charge and is at least one, X is a nonionized group and $n+m$ equal the valence of the metal. The utility of complexed metal ions employed in the formation of ionic copolymers corresponds in their ionized valences to those of the uncomplexed metal ions. The monovalent metals are, of course, excluded but higher valent metals may be included depending on how many metal valences are complexed and how many can be ionized. The preferred complexed metal ions are those in which all but one metal valence are complexed and one is readily ionized. Such compounds are in particular the mixed salts of very weak acids, such as oleic and stearic acid, with ionizable acids, such as formic and acetic acid.

The uncomplexed metal ions which are suitable in forming the ionic copolymers used in the present invention, therefore comprise for the α-olefinmonocarboxylic acid copolymers, mono-, di- and trivalent ions of metals in Groups. I, II, III, IV-A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionic copolymers of the present invention with copolymers of olefins and ethylenically unsaturated dicarboxylic acids. Suitable monovalent metal ions are $Na^+$, $K^+$, $Li^+$, $Cs^+$, $Ag^{+'}$ $Hg^+$, $Cu^+$. Suitable divalent metal ions are $Be^{+2}$, $Mg^{+2}$, $Ca^{+2'}$ $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni+2$ and $Zn+2$. Suitable trivalent metal ions are $Al^{+3}$, $Sc^{+3}$, $Fe^{+3}$ and $Y^{+3}$.

The preferred metals, regardless of the nature of the base copolymer are the alkali metals. These metals are preferred because they result in ionic copolymers having the best combination of improvement in solid state properties with retention of melt fabricability. It is not essential that only one metal ion be employed in the formation of the ionic copolymers and more than one metal ion may be preferred.

The quantity of ions employed or the degree of neutralization will differ with the degree of solid property change and the degree of melt property change desired. In general, it was found that the concentration of the metal ion should be at least such that the metal ion neutralizes at least 10 percent of the carboxylic acid groups in order to obtain a significant change in properties. As explained above, the degree of neutralization for optimum properties will vary with the acid concentration and the molecular weight of the copolymer. However, it is generally desirable to neutralize at least 50 percent of the acid groups. The degree of neutralization may be measured by several techniques. Thus, infrared analysis may be employed and the degree of neutralization calculated from the changes resulting in the absorption bands. Another method comprises the titration of a solution of the ionic copolymer with a strong base. In general, it was found that the added metal ion reacts stoichiometrically with the carboxylic acid in the polymer up to 90 percent neutralizations. Small excess quantities of the crosslinking agent are necessary to carry the neutralization to completion. However, large excess quantities of the crosslinking agent do not add to the properties of the ionic copolymer, since once all carboxylic acid groups have been ionically crosslinked, no further crosslinks are formed.

The crosslinking of the ionic copolymer is carried out by the addition of a metal compound to the base copolymer. The metal compound which is employed must have at least one of its valences satisfied by a group which is substantially ionized in water. The necessary ionization is determined by the water solubility of the metal when bonded solely to the ionizable salt group. A compound is considered water-soluble for the purposes of the present invention if it is soluble in water at room temperature to the extent of 2 weight percent. This requirement is explained as separating those ionic compounds which are capable of exchanging a metal ion for the hydrogen ion of the carboxylic acid group in the copolymer from those which do not interact with the acid. The second requirement of the metal compound, employed to give rise to the ionic crosslink is that the salt radical reacting with the hydrogen of the carboxylic acid group must form a compound which is removable from the copolymer under the reaction conditions. This requirement is essential to obtain the carboxylic acid group of the copolymer in ionic form and, furthermore, to remove the salt radical from the copolymer so that the attraction between the ionized carboxylic acid group of the copolymer and the metal ion is not overshadowed by the attraction of the metal ion and its original salt radical. With these two parameters it is, therefore, possible to determine those metal compounds which form metal ions having the required ionic valences. Although the foregoing limits delineate metal compounds suitable in forming metal ions in the acid copolymers which result in ionic crosslinks, certain types of compounds are preferred because of their ready availability and ease of reaction. Preferred metal salts include formates, acetates, hydroxides of sufficient solubility, methoxides, ethoxides, nitrates, carbonates and bicarbonates. Metal compounds which are generally not suitable in resulting in ionic crosslinks include in particular metal oxides because of their lack of solubility and the fact that such compounds form intractable compositions, metal salts of fatty acids which either are not sufficiently soluble or form compounds with the hydrogen of the acid which cannot be removed and metal coordination compounds which lack the necessary ionic character.

As set forth hereinabove, in addition to uncomplexed metal ions, complexed metal ions which contain the necessary ionic valences bonded to groups meeting the aforesaid requirements can be employed. In such cases the group which does not ionize or is not removed has no effect on the ability of the ionizing group to be removed and the resulting metal ion to cause the ionic crosslinking. Thus, whereas zinc distearate or calcium dioleate are ineffective to cause ionic crosslinking, such mixed metal salts as zinc stearate-acetate or calcium oleate-acetate are effective crosslinking agents.

It is not essential that the metal compound be added as such, but is it possible to form the metal compound in situ from components which react with each other in the desired manner in the polymer environment. Thus, it is possible to add a metal oxide to the base copolymer then add an acid such as acetic acid in the proper proportion and form the ionic compound, i.e., the metal acetate, while the polymer is milled.

The crosslinking reaction is carried out under conditions which allow for a homogeneous uniform distribution of the crosslinking agent in the base copolymer. No particular reaction conditions are essential except that the conditions should permit the removal of the hydrogen-salt radical reaction product which is preferably accomplished by volatilization. Since the homogeneous distribution of the hydrogen-salt radical reaction product is difficult at room temperature, elevated temperatures are generally employed. More specifically, the crosslinking reaction is carried out either by melt blending the polymer with the crosslinking metal compound, which preferably is employed in solution, or by adding the crosslinking agent, directly or in solution, to a solution of the copolymer base and then, on reaction, precipitating and separating the resulting polymer. Of these techniques, the first is greatly preferred because of its relative simplicity. It is to be understood, however, that the specific technique employed is not critical as long as it meets the specific requirements set forth above. The course of the neutralization, i.e., the degree to which the metal ion is ionically linked with the carboxylate ion and the carboxylate hydrogen has reacted with the metal compound anion and has been removed, can be readily followed by infrared spectroscopy through measurement of the nonionized and ionized carboxylate groups.

The ionic copolymers are thermoplastically moldable and may be heat-softened and extruded from conventional plastics extruders. The belting of the invention is fabricated conveniently by extruding on one side of the woven or knit fabric described above, a layer of the heat-softened ionic copolymer. Immediately following extrusion, the fabric with the extruded layer of ionic copolymer is pressed together in the nip of a calendar roll to provide a uniform elastomer thickness, penetrating the fabric and protruding partially through the fabric.

In a second extrusion, a layer of the heat-softened ionic copolymer is laid down on the side of the fabric opposite the initial extrusion. Pressing the fabric with the two extruded layers through the nip of a calendar roller finishes the embedding of the fabric in the matrix of the ionic polymer and sizes the conveyor belting to a desired thickness. Upon cooling to ambient temperatures, the belting is ready to make endless into a conveyor belt.

Desirably, the encapsulation of the heat set fabric will provide high loading of elastomer, substantially penetrating the textile fabric so as to encapsulate the yarns. Advantageously voids in the textile fabric are filled with elastomer so that elastomer is distributed throughout the body of the impregnated product. Advantageously the impregnation is such that the belting of the invention will comprise elastomer matrix constituting from 25 to 500 percent, preferably 100 to 350 percent of the textile fabric composition weight.

Referring now to FIG. 1, one may see an enlarged cross-sectional side elevation of an embodiment belting 10 of the invention prepared by the above-described method of the invention. The belting 10 consists of a woven scrim 12 including lengthwise yarns 14 which are textile yarns as described above. Crosswise yarns 16 may be, for example, spun polyester. The yarns are completely encapsulated in a matrix of a polymeric elastomer 20. The belting 10 is free of voids, and there is a high degree of enoapsulation with elastomer 20 of the yarns 14, 16.

Figure 2:
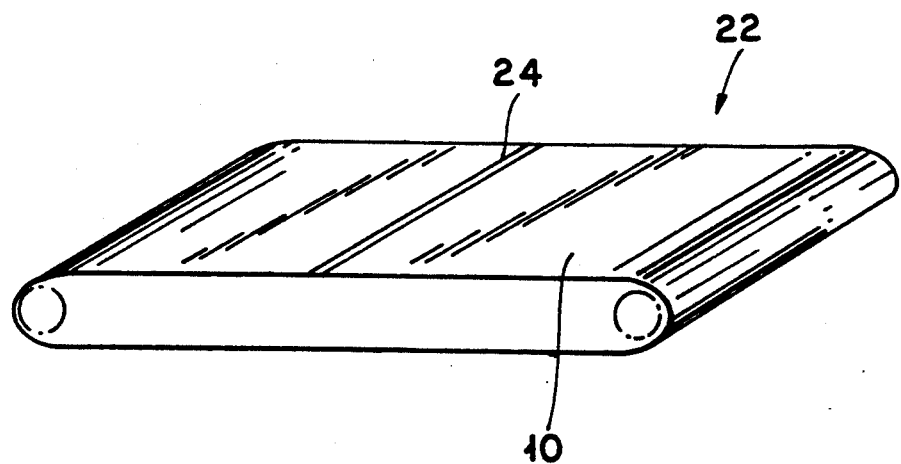
FIG. 2 is a view-in-perspective of an embodiment endless conveyor belt of the invention.

FIG. 2 is a view-in-perspective of an embodiment conveyor belt 22 of the invention. The belt 22 is seamed at seam 24 to join the free ends of belting 10.

The following examples describe the manner and process of making and using the invention and set forth the best mode contemplated by the inventors of carrying out the invention, but are not to be construed as limiting.

EXAMPLE 1

A fabric is woven with a plain weave using 0.020 inch diameter monofilament polyester; average elongation of 2% at nominal rated tension; break strength 500 lbs per inch width. The fabric is heat set under moderate lengthwise tension. The heat set fabric is then embedded in a matrix of an ionomer resin (Surlyn ™ Type 8020; an ethyleneethylenically unsaturated carboxylic acid group ionomer resin prepared as described in U.S. Pat. No. 3,264,272 and neutralized with sodium ions (melt flow index of 1.0 by ASTM test method D-1238), incorporated herein by reference thereto and commercially available from E.I. Dupont de Nemours and Company, Wilmington, Del.).

Embedding is accomplished by thermally plasticizing the ionomer resin in a twin screw polymer extruder and extruding in a first pass, a layer of the softened resin at a temperature of circa 175° C. on to the monofilament polyester screen. The semi-soft resin is pressed through the screen from pressure of a smooth surface cylinder, to protrude slightly through the screen.

In a second pass, a second layer of resin is extruded on to the opposite side of the screen and by pressure of a smooth surface cylinder, adhering the inner surface of the resin that protrudes through the screen from the first pass.

In this way, the woven monofilament is totally encapsulated by the resin from both sides. The monofilament screen provides strength, width and length stability, a non wicking core, lace holding characteristics, splicing strength, increased flex life both of the belt and splice area.

The resin material provides excellent non-staining characteristics when used in the conveyance of food products such as red beets, cherries, corn, red meat and the like.

The flexible belting product is 0.080" and 0.120" thick, weighing about 0.043 and 0.064" lbs./inch width per foot and having an ultimate tensile strength of 600 lbs./inch of width and a 3% elongation at 100 lbs./inch of width. The fabric is calculated to contain (0.080" thick) 3.25 lbs./square yard or (0.120" thick) 4.83 lbs./square yard of elastomer.

EXAMPLE 2

An open mesh knit is fabricated from 1000 Denier Dacron yarns (Type 68, E.I. Dupont De Nemours, supra.) on a 3 bar knitting machine using a pattern chain as follows:

| Pattern Chain | | |
|---|---|---|
| Bar #1 | Bar #2 | Bar #3 |
| 5-5 | 0-0 | 1-0 |
| 0-0 | 5-5 | 0-1 | and 6 beams to a bar (63 ends/beam). The mesh is heat set at a temperature of 380° F. for 45 seconds. The heat set mesh is embedded in an ionomer resin (Surlyn ™ type 8020, supra) as described in Example 1, supra. Both resin surfaces have a matt finish for good product release. The knit polyester is totally encapsulated by the resin from both sides. The belting is characterized by the following:

| | |
|---|---|
| NOMINAL THICKNESS (Inches) | .120 |
| WEIGHT LBS/INCH/FT | .064 |
| SLAB WIDTH (Inches) | 40 & 60 |
| MINIMUM PULLY DIAMETER (Inches) | |
| NORMAL FLEXING - | 3* |
| REVERSE BEND - | 5 |
| ALLOWABLE WORKING TENSION (lbs./inch): | 100 |
| 1% ELONGATION (lbs/inch) | 40 |
| OPERATING TEMPERATURE (°F.): | |
| MINIMUM DRY- | −40 |
| MAXIMUM CONTINUOUS | +140 |
| MAXIMUM INTERMITTENT- | +140 |

*For temperatures below −10° F. double the minimum pulley diameter for optimum flex life.

EXAMPLE 3

The procedure of Example 2, supra., is repeated except that a thinner layer of the resin is extruded on the knit fabric. The product belting has the following characteristics.

| | |
|---|---|
| NOMINAL THICKNESS (Inches) | .80 |
| WEIGHT LBS/INCH/FT | .043 |
| SLAB WIDTH (Inches) | 40 & 60 |
| MINIMUM PULLY DIAMETER (Inches) | |
| NORMAL FLEXING - | 2* |
| REVERSE BEND - | 4 |
| ALLOWABLE WORKING TENSION (lbs./inch): | 80 |
| 1% ELONGATION (lbs/inch) | 30 |
| OPERATING TEMPERATURE (°F.): | |
| MINIMUM DRY- | −40 |
| MAXIMUM CONTINUOUS | +140 |
| MAXIMUM INTERMITTENT- | +140 |

*For temperatures below −10° F. double the minimum pulley diameter for optimum flex life.

Unit 60" wide rolls of belting slit from a 500 ft. master roll are used to fabricate endless conveyor belts of the invention, from each of the Examples 1-3 by joining the ends of the slit belting. The endless belts are used to equip a conveyor. The conveyor exhibits no problems with cold weather start-up, is quiet running, non-marking, tracks well and exhibits cut and tear resistance.

Joining of the belting ends to obtain an endless belt as shown in FIG. 2, may be accomplished by clipper seams, alligator seams or hot splices.

The belt provides excellent non staining characteristics when used in the conveyance of food products such as red beets, cherries, corn, red meat and the like.

What is claimed is:
1. A conveyor belting which comprises;
    a plurality of substantially parallel, uncrimped textile yarns characterized by their high tensile strength, low stretch and uniformity of shrink; embedded in a matrix consisting essentially of a synthetic non-cellular, elastomeric, ionic copolymer of α-olefin and α,β-ethylenically unsaturated carboxylic acids having from 3 to 8 carbon atoms, said copolymer having from 10% to 90% of the carboxylic acid groups ionized by neutralization with metal ions uniformly distributed throughout the copolymer, said copolymer being a direct copolymer of the α-olefins and the unsaturated carboxylic acid in which the carboxylic acid groups are randomly distributed over all molecules and in which (1) the α-olefin content of the copolymer is at least 50 mole percent, based on the α-olefin-acid copolymer, (2) the unsaturated carboxylic acid content of the copolymer is from 0.2 to 25 mole percent, based on the α-olefin-acid copolymer, and (3) any other monomer component optionally copolymerized in said copolymer is monoethylenically unsaturated, and said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions, said ionic copolymer having solid state properties characteristic of crosslinked polymers and melt-fabricability properties characteristic of an uncrosslinked, thermoplastic polymer; substantially encapsulating the parallel yarns.

2. The belting of claim 1 wherein said yarns are yarns in a cloth.

3. The belting of claim 2 wherein said yarns are the lengthwise yarns in a knitted cloth.

4. The belting of claim 2 wherein said yarns are lengthwise yarns in a woven cloth.

5. The belting of claim 1 where said yarns are polyester.

6. The belting of claim 1 wherein the matrix comprises from 10 to 500 percent by weight of the yarns.

* * * * *